United States Patent [19]

Cook et al.

[11] Patent Number: 5,723,521

[45] Date of Patent: Mar. 3, 1998

[54] METHOD OF PREPARING SOLVENTLESS SILICONE RESINS THAT EXHIBIT SUPERIOR RECONSTITUTION AND THE RESINS SO-PRODUCED

[75] Inventors: Leon Neal Cook; Richard Allen Hessick, Jr.; Hongxi Zhang; Randall Gene Schmidt, all of Midland, Mich.

[73] Assignee: Dow Corning Corporation, Midland, Mich.

[21] Appl. No.: 497,736

[22] Filed: Jul. 3, 1995

[51] Int. Cl.[6] .................................................. C08K 5/54
[52] U.S. Cl. ............................................ 524/268; 525/478
[58] Field of Search ............................... 525/475; 524/265

[56] References Cited

U.S. PATENT DOCUMENTS

| | | | |
|---|---|---|---|
| 2,676,182 | 4/1954 | Duadt et al. | 260/448.2 |
| 3,691,128 | 9/1972 | Vincent | 524/588 |
| 4,256,870 | 3/1981 | Eckberg | 528/15 |
| 4,309,520 | 1/1982 | Blizzard | 525/477 |
| 4,935,484 | 6/1990 | Wolfgruber et al. | 528/34 |
| 5,324,806 | 6/1994 | Wengrovius et al. | 528/10 |
| 5,346,941 | 9/1994 | Furukawa et al. | 524/268 |
| 5,357,007 | 10/1994 | Wengrovius et al. | 525/478 |

FOREIGN PATENT DOCUMENTS 0614959  9/1994  European Pat. Off. .

OTHER PUBLICATIONS

Patent Abstracts of Japan; vol. 018, No. 651(C–1285) 9 Dec. 1994; JP 06254368 A (Horiba, Ltd.) 13 Sept. 1994.

*Primary Examiner*—Melvyn I. Marquis
*Attorney, Agent, or Firm*—Arne R. Jarnholm

[57] ABSTRACT

Solventless silicone resins, which exhibit a high degree of reconstitution, are produced in forms such as powders and flakes. The degree of reconstitution is judged by the fact that silicone resin/fluid alloys produced therefrom exhibit only a minor shift in $T_g$, the glass transition temperature, in comparison to analogous alloys produced from solvent dispersed (virgin) resin. Resin, and preferably virgin resin, is dispersed in a volatile liquid dispersant and blended with a nonvolatile silicone fluid. Thereafter, the volatile liquid dispersant is removed by means such as spray-drying or evaporation, resulting in the solventless resin forms of the invention.

9 Claims, 1 Drawing Sheet

METHOD OF PREPARING SOLVENTLESS SILICONE RESINS THAT EXHIBIT SUPERIOR RECONSTITUTION AND THE RESINS SO-PRODUCED

BACKGROUND OF THE INVENTION

1. Field of the Invention

The present invention relates generally to silicone resins and more particularly to a novel method of making solventless silicone resins, for instance in the form of powder or flakes. The solventless resins produced by the method of the invention exhibit a superior degree of reconstitution, meaning that they are readily dispersed and incorporated into the formulation of other products, such as silicone rubbers and paint formulations.

2. Description of the Prior Art

Description of the prior art and the present invention requires that the definition of certain terms be understood.

As used herein, the term "silicone fluid" describes a linear silicone polymer, for example polydimethylsiloxane, and may also include cyclosiloxanes, i.e. predominantly linear polymers in a ring-like structure. The term "fluid" is used in this sense even if the linear polymer contains a minor amount of branched chains or if, at room temperature, the material appears as more of a gum or solid. In other words, the term "fluid" describes only the predominantly linear characteristics of the polymer. It will be understood that silicone fluids may also include reactive or functional groups.

Silicone fluids, then, can be defined as being of the general formula:

$$(R_3SiO_{1/2})_x(R_2SiO_{2/2})_y(RSiO_{3/2})_z$$

wherein x, y and z are positive numerical values with the provisos that $x+y+z=1$, $y/(x+y+z) \geq 0.9$ and R' is a functional or nonfunctional, substituted or unsubstituted organic radical.

As used herein, the term "resin" describes a silicone composition wherein the molecular structure is arranged in a predominantly three dimensional network. Thus, the term silicone "resin" is used to distinguish the composition from silicone fluids and silanes. The silicone resins utilized in the present invention are macromolecular polymers comprised primarily of $R_3SiO_{1/2}$ and $SiO_{4/2}$ units, wherein R is a functional or nonfunctional, substituted or unsubstituted organic radical. Those skilled in the art will appreciate that such resins may also include a limited number of $R_2SiO_{2/2}$ and $RSiO_{3/2}$ units. Such resins are frequently produced by the method disclosed in U.S. Pat. No. 2,676,182, Daubt et al., which is incorporated herein by reference.

The term "alloy" is used to describe compositions comprised primarily of a combination of silicone fluids and resins. When used in a strictly metallurgical sense, the term "alloy" implies the fusion of two or more constituents, at least one of which is metallic, to achieve physical properties that are not independently exhibited by either constituent. Thus, the term "alloy," as used in a broader sense herein, describes the fusion or blending of silicone resin and fluid constituents to achieve physical properties that are not independently exhibited by the resin or fluid.

Those skilled in the art will recognize that the compositions described herein as silicone resin/fluid alloys may or may not include chemical bonding between resins and fluids, or between the molecules of the constituents themselves, which bonding may or may not be carried out by the addition of crosslinking reactants.

Silicone alloy compositions are well-known in the art. See, for instance U.S. Pat. No. 4,309,520, Blizzard, which teaches a silicone resin/fluid alloy that is useful as a pressure sensitive adhesive. Blizzard discloses an alloy composition of 45 to 75 parts by weight resin and 25 to 55 parts by weight fluid, per 100 parts total weight. Example 1 therein is typical of the preparation of such alloys, in that the resin component, as supplied, is dispersed in an organic solvent, and that the alloy is formed in an organic solvent. Well-known solvents such as toluene, xylene or benzene are typically used. Accordingly, in the manufacture of the pressure sensitive adhesive taught in Blizzard, the resin component is never reduced to a solventless form. That is to say, the resin is dispersed in an organic or aqueous solvent medium, even as the pressure sensitive adhesive alloy is blended.

Silicone resins are generally produced in such a manner that the resin macromolecules are dispersed in a liquid medium, which liquid medium is most typically but not always an organic solvent. Thus, as used herein, the term "solventless" means that substantially all the liquid dispersant has been removed from the "solid" resin phase.

It is known in the art to produce solventless forms of silicone resins.

In U.S. Pat. No. 4,935,484, Wolfgruber et al., there is disclosed a method for obtaining such silicone resin powders by spray-drying aqueous colloidal suspensions of organopolysiloxanes. The process utilizes resins prepared from alkoxysilanes, or the partial hydrolyzate thereof and an emulsifier. The hydrolytically-formed alkanol is distilled off and the resultant suspension spray-dried. Organopolysiloxanes, which are free of alkoxy groups and which have a maximum of eight siloxane units per molecule, may also be employed, provided that they are mixed with at least one alkoxy silane or a partial hydrolyzate thereof.

According to the teachings of U.S. Pat. No. 5,324,806 Wengrovius et al., the method of Wolfgruber et al. suffers from the drawback that the powdered resins produced thereby are incompatible with silicone fluids. It is believed that at least some of the incompatibility results from contamination with an emulsifying agent. Thus, Wengrovius et al. conclude that heat-curable silicone alloy compositions that include both resins and fluids, such as pressure sensitive adhesives, cannot be successfully made from the powdered resins of Wolfgruber et al.

As used herein, then, the terms "reconstitution" and "degree of reconstitution," as applied to a solventless resin, are a measure of preselected performance characteristics of a silicone alloy composition or other composition incorporating a solventless resin, in comparison to the same performance characteristics of the identical silicone alloy or other composition, wherein the silicone resin has never been reduced to solventless form. For example, a comparison of the physical properties of two pressure sensitive adhesives, one prepared in accordance with the teachings of Blizzard and the other prepared in an identical manner except utilizing a powdered resin, would be a measure of the degree of the reconstitution of the powdered resin. Thus, it can be said that Wengrovius et al. found that the powdered resins of Wolfgruber at al. had such a poor degree of reconstitution in pressure sensitive adhesives of the silicone resin/fluid alloy-type, so as to characterize the powdered resin as "incompatible" with the fluid.

For purposes of clarity, hereinafter the terms "virgin resin" and "reconstituted resin" will be respectively used to designate resins which have never been removed from liquid dispersion and those which have been reduced to "solventless" form and redispersed in a liquid phase dispersant or otherwise incorporated into a composition as a constituent thereof.

U.S. Pat. No. 5,324,806 Wengrovius et al. discloses a method of making a free-flowing silicone resin powder in which an organosiloxane hydrolyzate is dispersed into an organic solvent and thereafter spray-dried. The silicone resin powders produced by the method of Wengrovius et al., however, also exhibit a poor degree of reconstitution, albeit not as poor as those produced by the method of Wolfgruber et al.

Thus, it would be highly desirable to provide a method of preparing solventless silicone resins wherein the reconstituted resins produced therefrom exhibit a degree of reconstitution that renders their use almost indistinguishable from the use of virgin resins.

BRIEF SUMMARY OF THE INVENTION

In accordance with the present invention, there is provided a method of preparing solventless silicone resins comprising the steps of:

(1) preparing a dispersion of a silicone resin dispersed in a volatile liquid dispersant;

(2) dispersing from 2 to 25 parts of a nonvolatile silicone fluid, per 75 to 98 parts of said silicone resin, based upon 100 parts, by weight, of the total of said resin and said nonvolatile silicone fluid, in the dispersion obtained in step (1); and (3) thereafter removing the volatile liquid dispersant therefrom.

In accordance with the invention, the volatile liquid dispersant may be removed by simple evaporation or spray drying, to respectively produce flake or powder forms of solventless resins. Other forms of removing the volatile liquid dispersant contemplated by the present inventors include co-precipitation of the nonvolatile silicone fluid and resin therefrom in a nonsolvent such as water before evaporation of the residual volatile liquid dispersant. Evaporation may be augmented by subjection to an elevated temperature, reduced pressure or both.

The solventless silicone resins produced by the method of the invention exhibit a superior degree of reconstitution. The use of the reconstituted resins of the invention to formulate silicone resin/fluid alloys results in compositions that have physical properties virtually indistinguishable from those formulated with virgin resin. In the present application for patent, the degree of reconstitution of the solventless resins is measured by the shift in the glass transition temperature (or lack or minimization thereof) of silicone resin/fluid alloys produced therewith.

The aforementioned features and advantages of the present invention will become clear to those skilled in the art from the following Detailed Description of the Invention and Drawing.

DETAILED DESCRIPTION OF THE INVENTION

Figure 1:
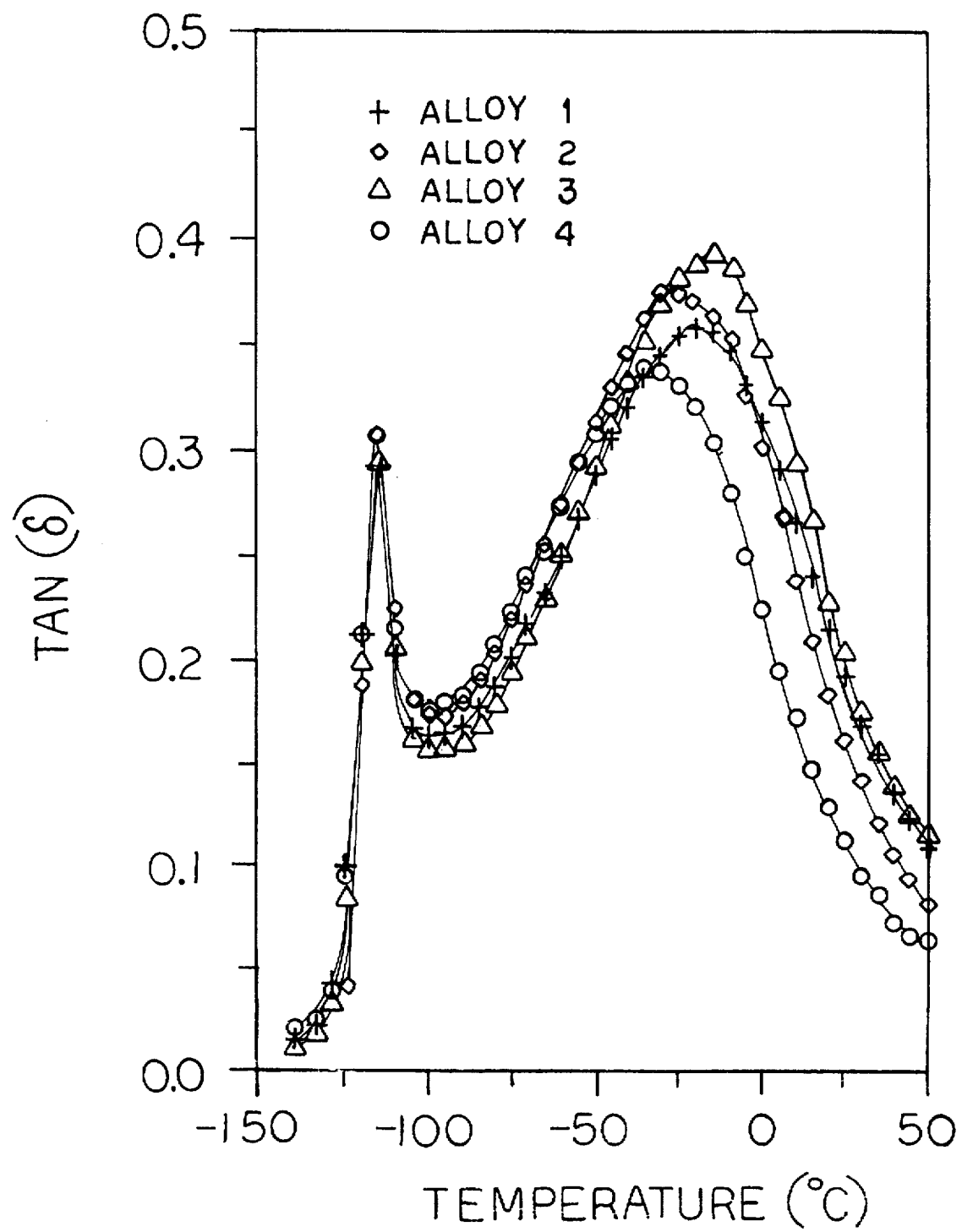
FIG. 1 is a graph of the loss tangent, tan (δ), as a function of temperature, for four 50/50 silicone resin/fluid alloys. Of the four alloys, one was formulated with virgin resin, and three with reconstituted resin powders. Of the reconstituted resin powders, one was spray-dried in accordance with the prior art and two were produced in accordance with the invention, utilizing slightly different levels of a nonvolatile silicone fluid.

In accordance with the present invention, solventless silicone resins are made by: (1) preparing a dispersion of a silicone resin dispersed in a volatile liquid dispersant; (2) dispersing from 2 to 25 parts of a nonvolatile silicone fluid, per 75 to 98 parts of said silicone resin, based upon 100 parts, by weight, of the total of said resin and said nonvolatile silicone fluid, in the dispersion obtained in step (1); and (3) thereafter removing the volatile liquid dispersant therefrom.

It will be clear to those skilled in the art that the preparation of the dispersion in step (1) will most often be a dispersion of a virgin silicone resin, but that the present invention is not so-limited.

In the preferred embodiment of the invention, the silicone resins that are made solventless are of the general formula:

$$(R_3SiO_{1/2})_a(R_2SiO_{2/2})_b(RSiO_{3/2})_c(SiO_{4/2})_d$$

wherein: a, b, c and d are positive numerical values with the provisos that $a+b+c+d=1$, $1/2(b+c+d) \leq a \leq (b+c+d)$, and $0 \leq (b+c)/d \leq 0.2$; and R is a monovalent radical independently selected from the group consisting of hydrogen, hydroxyl, alkyl, alkenyl, alkoxy, oximo, aryl, epoxide, carboxyl, ether, amide and alkyl amino radicals with the proviso that at least sixty mole percent of said R radicals are methyl. Further in the preferred embodiment of the invention, the organosilicone resin has a number average molecular weight (Mn) between about 2,000 and about 7,000. Silicone resins within the above formula and aforementioned molecular weight range have been shown to have great utility in the formulation of silicone fluid/resin alloys.

It is important to note that the terms "volatile" and "nonvolatile" have been used to describe the liquid dispersant and the silicone fluid, respectively. It will be understood by those skilled in the art that the terms are relative to one another and to the conditions under which the removal of the liquid dispersant is accomplished.

For instance, if the liquid dispersant is to be removed by simple evaporation at ambient or slightly elevated temperatures, a volatile dispersant such as toluene, xylene, methylene chloride or low molecular weight siloxanes such as hexamethyldisiloxane or octamethylcyclosiloxane may be selected. Under such conditions, the nonvolatile silicone fluid should have a sufficiently low vapor pressure to ensure that substantially all the nonvolatile silicone fluid remains behind with the solventless silicone resin. Simple evaporation, even when augmented by a reduced pressure atmosphere and an elevated temperature, causes the solventless resin to coagulate into a friable mass that can readily be broken into flake form.

Likewise, if the volatile liquid dispersant is to be removed by spray-drying, which usually includes exposure to a temperature well above ambient, the vapor pressure of the nonvolatile silicone fluid at that temperature should be sufficiently low to ensure that substantially all the nonvolatile silicone fluid remains behind with the solventless silicone resin.

Those skilled in the art will appreciate that many of the volatile liquid dispersants suggested herein or usable in connection with the present invention, are readily combustible. Accordingly, certain means for removal may require precautionary measures, such as spray-drying in a nitrogen or argon blanket.

Spray-drying techniques, are well-known in the art and produce the solventless resin of the invention in a free-flowing powder form. Conditions of spray-drying, such as inlet and outlet temperatures and feed rates can be used to control the particle size of the powders produced therefrom.

The composition of the volatile liquid dispersant in which the silicone resin is dispersed is important only to the extent that it does not impart the solventless resin with properties that are deleterious to the end product in which the resin is incorporated.

In the preferred embodiment of the invention, the nonvolatile silicone fluid has the general formula:

$$(R'_3SiO_{1/2})_x(R'_2SiO_{2/2})_y(R'SiO_{3/2})_z$$

wherein: x, y and z are positive numerical values with the provisos that $x+y+z=1$ and $y/(x+y+z) \geq 0.9$; and R' is a monovalent radical independently selected from the group consisting of hydrogen, hydroxyl, alkyl, alkenyl, alkoxy, oximo, aryl, epoxide, carboxyl, ether, amide and alkyl amino radicals with the proviso that at least ninety mole percent of said R' radicals are methyl, and the silicone fluid has a degree of polymerization that is sufficiently high to render the fluid nonvolatile under conditions of removal of the liquid dispersant. In the preferred embodiment, the nonvolatile silicone fluid has a degree of polymerization between about 50 and 100,000. This range of the degree of polymerization renders a silicone fluid that is nonvolatile under most conditions.

However, it will be understood by those skilled in the art that if a highly volatile liquid dispersant is employed, lower molecular weight siloxanes, such as cyclosiloxanes, may be employed as the nonvolatile silicone fluid component. It is important to note that the composition of the nonvolatile silicone fluid component should be such that it does not deleteriously affect the degree of reconstitution of the solventless resin to the point that it defeats the purpose of the present invention.

The amount of nonvolatile silicone fluid that is used in the practice of the invention is from about 2 parts to about 25 parts, per 100 parts, by weight, of the total of the nonvolatile silicone fluid and the silicone resin solids. If lesser amounts of nonvolatile silicone fluid are employed, then the benefit of a high degree of reconstitution of the solventless resin produced therefrom is lost. If greater amounts are employed, then the solventless resin so-produced takes on the undesirable physical characteristics, behaving in more of a mud- or gum-like manner.

Referring now to FIG. 1, there is graphically illustrated the value of the loss tangent, tan (δ), of four silicone resin/fluid alloys as a function of temperature. Each of the four silicone resin/fluid alloys has the identical chemical make-up, the only difference being the source of the resin that was employed.

A virgin resin was prepared from the acid (HCl) hydrolysis/condensation of sodium silicate. The polymerization was terminated by end-capping through the addition of an isopropyl alcohol solution of trimethylchlorosilane and hexamethyldisiloxane. The HCl and isopropyl alcohol were washed from the end-capped polymer resin and the hexamethyldisiloxane was solvent exchanged with xylene. The xylene-dispersed resin had a chemical formula which generally corresponded to:

$$(R_3SiO_{1/2})_{0.39}(R_2SiO_{2/2})_0(RSiO_{3/2})_{0.14}(SiO_{4/2})_{0.47}$$

wherein approximately 10 mole percent of the R groups were hydroxyl radicals and the balance methyl groups. The xylene-dispersed resin comprised about 71.5 wt. percent solids and had a number average molecular weight ($M_n$) of about 4,850.

A first 50/50 silicone resin/fluid alloy (Alloy 1) was then prepared by blending a dimethylvinylsiloxy-terminated polydimethylsiloxane fluid (having a degree of polymerization of about 150) with the xylene-dispersed virgin resin in a weight ratio (based upon solids) of 50 parts virgin resin to 50 parts silicone fluid. The xylene solvent was then vacuum-stripped at about 28 inches Hg vacuum at a temperature of 120° C. for 15 hours. A trimethylsiloxy end-capped hydrogen siloxane crosslinker, having an average of 12 dimethylsiloxy and 28 methylhydrogensiloxy units per molecule, was added to the stripped formulation under conditions of constant mixing. The crosslinker was added in such an amount that the ratio of SiH units in the crosslinker to the SiCHCH$_2$ units in the dimethylvinylsiloxy-terminated silicone fluid was 1.5. Thereafter, about 0.02 g of diethylfumarate, a crosslinking inhibitor, was added per 10 g of the combined weights of the stripped resin and silicone fluid, again under conditions of constant mixing. Finally, about 0.02 g of a platinum catalyst (1.5 wt. % chloroplatinic acid dispersed in short-chained siloxanes) was added per 10 g of the combined weights of resin and dimethylvinylsiloxy-terminated silicone fluid and mixing continued for an additional five minutes. All mixing was carried out using a mixer sold under the trade name Haake Rheocord 90, equipped with a model 600 mixing unit.

Alloy 1, which had a somewhat pasty consistency, was thereafter compression molded at a temperature of 170° C. for 10 minutes to produce cured rectangular slabs about 2 mm thick.

Next, a second 50/50 silicone resin/fluid alloy (Alloy 2) was prepared and molded in a manner identical to that of Alloy 1, except that, in accordance with the present invention, 90 parts, by weight (solids,) of the virgin xylene-dispersed silicone resin was first blended with 10 parts, by weight, of the dimethylvinylsiloxy-terminated polydimethylsiloxane fluid, which is in and of itself a nonvolatile silicone fluid. Thereafter the xylene in the resin-rich dispersion was solvent-exchanged with methylene chloride, a nonflammable solvent, yielding a dispersion having 10 percent solids, by weight.

The methylene chloride resin dispersion was then spray-dried utilizing a spray drier from Niro Atomizer, Inc. of Columbia, Md., described as a Niro mobile minor unit. Approximately 200 g of solventless resin-rich powder was produced by spray-drying the methylene chloride-dispersed resin and nonvolatile silicone fluid mixture. The spray drier had an inlet temperature of about 85°–95° C. and an outlet temperature of about 65°–75° C. Spray-drying was carried out in an ambient atmosphere to remove the methylene chloride, the volatile liquid dispersant.

The spray-dried resin-rich powder was then mixed with platinum catalyst and inhibitor and an additional quantity of the dimethylvinylsiloxy-terminated polydimethylsiloxane fluid to prepare a 50/50 silicone resin/fluid alloy (Alloy 2.)

A third 50/50 silicone resin/fluid alloy (Alloy 3) was prepared and cured in a manner identical to that of Alloy 2, except that, in accordance with the present invention, 80 parts, by weight, of the virgin xylene-dispersed silicone resin was first blended with 20 parts, by weight, of the dimethylvinylsiloxy-terminated polydimethylsiloxane. In a manner identical to that described in connection with Alloy 2, the xylene in the resin-rich dispersion was replaced with methylene chloride and spray-dried under identical conditions. Alloy 3 was thereafter prepared and cured in the manner described above.

Finally, a fourth 50/50 silicone resin/fluid alloy (Alloy 4) was prepared and molded in a manner identical to that of Alloy 1, except that the xylene in the virgin silicone resin was first replaced with methylene chloride and thereafter spray-dried, without the addition of a nonvolatile silicone fluid, before being blended with the dimethylvinylsiloxy-terminated polydimethylsiloxane fluid, crosslinker, inhibitor and catalyst.

In order to measure the loss tangent, tan (δ), of Alloys 1 through 4, rectangular test specimens of 2"×0.25" were stamped from the molded slabs. A dynamic mechanical thermal analyzer, model no. RDA-2 (available from Rheometrics, Inc. of Piscataway N.J.) having a rectangular torsion tool geometry, was utilized. Temperature sweeps, at intervals of 5° C., from −140° C. to about 50° C., employing strains which insured linear viscoelastic behavior throughout, at a frequency of 1 radian per second, were used to determine the temperature-dependent loss tangent of the specimens.

Referring once again to FIG. 1, it can be seen that for each alloy, the loss tangent, tan (δ), exhibits two points at which $\delta[\tan(\delta)]/\delta T=0$. These two points are commonly referred to as the glass transition temperature, $T_g$, for a given material. The first such point, characterized by the sharpness of the peak and occurring at about −115° C., corresponds roughly to the $T_g$ of the nonvolatile silicone fluid. Those skilled in the art will, however, appreciate that the second, gentler peak corresponds to $T_g$ for the silicone resin/fluid alloy.

Indeed, $T_g$ for each of Alloys 1 through 4 is −20°, −25°, −15° and −32° C., respectively. Thus, it can be clearly seen from FIG. 1 that the silicone resin used in Alloys 2 and 3, which was produced in accordance with the invention, exhibited an especially high degree of reconstitution. Each of Alloys 2 and 3 had a $T_g$ within a few degrees of Alloy 1, which was produced with virgin resin. Alloy 4, which utilized solventless resin that was spray-dried from virgin, without the addition of a nonvolatile silicone fluid, had a $T_g$ a full 12° C. lower than Alloy 1.

A fifth alloy, Alloy 5, was prepared and had a chemical composition identical to Alloys 1 through 4. Alloy 5 was prepared in a manner identical to that of Alloy 4, except that flake resin, produced from the simple evaporation of the liquid dispersant of virgin resin, without the inclusion of a nonvolatile silicone fluid, was substituted for the spray-dried powder resin. Alloy 5 had a $T_g$ of −42.5° C., thus exhibiting an even poorer degree of reconstitution.

Next 50/50 silicone resin/fluid Alloys 6 through 11 were prepared and $T_g$ for each alloy was measured. Each of these alloys was prepared by blending various forms of the previously described silicone resins with dimethylvinylsiloxy-terminated dimethyl siloxane, methyl vinyl siloxane copolymer having 0.14 mole % methyl vinyl siloxane units and a degree of polymerization of about 10,000. In each instance, if the resin was produced in accordance with the invention, the total weight percent of the silicone fluid was adjusted such that the final weight ratio of resin/fluid in each alloy was 50/50. All mixing was carried out at a temperature of 150° C.

Alloy 6 utilized the previously described virgin resin and exhibited a $T_g$ of −22° C.

Alloy 7 utilized resin powder that was spray-dried from virgin, without the addition of a nonvolatile silicone fluid, and had a $T_g$ of −36° C.

Alloy 8 utilized a spray-dried resin powder that was produced in accordance with the invention, in that it included 10 weight percent of the nonvolatile silicone fluid described in accordance with Alloy 2. Alloy 8 had a $T_g$ of −32° C.

Alloy 9 utilized a spray-dried resin powder that was produced in accordance with the invention in that it included 20 weight percent of the nonvolatile silicone fluid described in accordance with Alloy 3. Alloy 9 had a $T_g$ of −28° C.

Alloy 10 was produced utilizing a flake resin, which flake resin was not produced in accordance with the invention. Alloy 10 had a $T_g$ of −53° C.

Alloy 11 was produced utilizing a flake resin produced in accordance with the invention in that it included 20 weight percent of the nonvolatile silicone fluid described in connection with Alloys 2 and 3. Alloy 11 had a $T_g$ of −34° C.

The above data clearly show that, the use of a solventless resin produced in accordance with the present invention shows a higher degree of reconstitution than resins produced by the prior art. The shift of $T_g$ associated with use of solventless silicone resins in silicone resin/fluid alloys (as compared to produced from virgin resin) is minimized by preparation of the solventless resin in accordance with the invention.

Although various embodiments of the present invention have been illustrated by way of example so as to show the features and advantages of the invention, the scope thereof is not so-limited and is in accordance only with the following claims and equivalents thereof.

That which is claimed is:

1. A method of making a solventless silicone resin that exhibits a superior degree of reconstitution, said method comprising the steps of:

(1) preparing a dispersion of a silicone resin dispersed in a volatile liquid dispersant;

(2) dispersing from 2 to 25 parts of a nonvolatile silicone fluid, per 75 to 98 parts of said silicone resin, based upon 100 parts, by weight, of the total of said resin and said nonvolatile silicone fluid, in the dispersion obtained in step (1); and (3) thereafter removing the volatile liquid dispersant therefrom.

2. A method in accordance with claim 1 wherein said step (3) is carried out by spray-drying the dispersion obtained in said step (2) so as to obtain said solventless silicone resin in powder form.

3. A method in accordance with claim 1 further comprising the step of co-precipitating said resin and said nonvolatile silicone fluid from the liquid dispersion obtained in step (2), before carrying out said step (3).

4. A method in accordance with claim 1 wherein said step (3) is carried out in such a manner so as to cause said resin and said nonvolatile silicone resin to congeal into a friable mass which can be broken to produce flakes therefrom.

5. A method in accordance with claim 1 wherein said silicone resin is of the general formula:

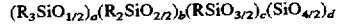

$(R_3SiO_{1/2})_a(R_2SiO_{2/2})_b(RSiO_{3/2})_c(SiO_{4/2})_d$ wherein: a, b, c and d are positive numerical values with the provisos that $a+b+c+d=1$, $1/2(b+c+d) \leq a \leq (b+c+d)$, and $0 \leq (b+c)/d \leq 0.2$; and R is a monovalent radical independently selected from the group consisting of hydrogen, hydroxyl, alkyl, alkenyl, alkoxy, oximo, aryl, epoxide, carboxyl, ether, amide and alkyl amino radicals with the proviso that at least sixty mole percent of said R radicals are methyl.

6. A method in accordance with claim 5 wherein said silicone resin has a number average molecular weight between about 2,000 and about 7,000.

7. A method in accordance with claim 1 wherein said volatile liquid dispersant includes a siloxane.

8. A method in accordance with claim 7 wherein said siloxane volatile liquid dispersant is hexamethyldisiloxane.

9. A method in accordance with claim 1 wherein said silicone resin is virgin.

* * * * *